(12) United States Patent
Olshanov et al.

(10) Patent No.: US 9,177,149 B2
(45) Date of Patent: Nov. 3, 2015

(54) METHOD OF DETECTING MALWARE IN AN OPERATING SYSTEM KERNEL

(71) Applicant: Joint Stock Company "Info TeCS", Moscow (RU)

(72) Inventors: Konstantin Dmitrievich Olshanov, Taganrog (RU); Evgeny Petrovich Tumoyan, Taganrog (RU); Sergei Nikolaevich Cherementsev, Sochi (RU)

(73) Assignee: Joint Stock Company "InfoTeCS", Moscow (RU)

( * ) Notice: Subject to any disclaimer, the term of this patent is extended or adjusted under 35 U.S.C. 154(b) by 0 days.

(21) Appl. No.: 14/391,763

(22) PCT Filed: Mar. 27, 2013

(86) PCT No.: PCT/RU2013/000249
§ 371 (c)(1),
(2) Date: Oct. 10, 2014

(87) PCT Pub. No.: WO2013/154459
PCT Pub. Date: Oct. 17, 2013

(65) Prior Publication Data
US 2015/0096028 A1 Apr. 2, 2015

(30) Foreign Application Priority Data
Apr. 11, 2012 (RU) ................................. 2012113963

(51) Int. Cl.
G06F 11/00 (2006.01)
G06F 21/56 (2013.01)
G06F 21/55 (2013.01)

(52) U.S. Cl.
CPC .............. *G06F 21/566* (2013.01); *G06F 11/00* (2013.01); *G06F 21/554* (2013.01); *G06F 21/56* (2013.01)

(58) Field of Classification Search
CPC ....... G06F 21/54; G06F 21/55; G06F 21/566; G06F 11/00; G06F 21/56; G06F 21/554
USPC ..................................................... 726/22–24
See application file for complete search history.

(56) References Cited

U.S. PATENT DOCUMENTS

| 7,571,482 | B2 | 8/2009 | Polyakov et al. | |
|---|---|---|---|---|
| 7,647,636 | B2 | 1/2010 | Polyakov et al. | |
| 7,673,137 | B2 | 3/2010 | Satterlee et al. | |
| 8,099,785 | B1* | 1/2012 | Pavlyushchik | 726/24 |
| 8,104,089 | B1 | 1/2012 | Guo et al. | |
| 8,572,729 | B1* | 10/2013 | Lowe et al. | 726/22 |
| 8,677,492 | B2* | 3/2014 | Rusakov | 726/24 |
| 9,009,823 | B1* | 4/2015 | Ismael et al. | 726/22 |
| 2008/0022406 | A1* | 1/2008 | Clift et al. | 726/24 |
| 2009/0187763 | A1* | 7/2009 | Freericks et al. | 713/167 |
| 2009/0288167 | A1* | 11/2009 | Freericks et al. | 726/23 |
| 2010/0122343 | A1* | 5/2010 | Ghosh et al. | 726/23 |
| 2010/0199325 | A1* | 8/2010 | Raleigh | 726/3 |
| 2011/0289308 | A1* | 11/2011 | Sobko et al. | 713/100 |
| 2012/0079596 | A1* | 3/2012 | Thomas et al. | 726/24 |
| 2012/0159630 | A1* | 6/2012 | Wang | 726/24 |
| 2012/0255015 | A1* | 10/2012 | Sahita et al. | 726/24 |
| 2013/0091318 | A1* | 4/2013 | Bhattacharjee et al. | 711/6 |
| 2013/0097355 | A1* | 4/2013 | Dang et al. | 711/6 |
| 2013/0263270 | A1* | 10/2013 | Cote et al. | 726/24 |
| 2014/0047544 | A1* | 2/2014 | Jakobsson | 726/23 |
| 2015/0033227 | A1* | 1/2015 | Lin et al. | 718/1 |
| 2015/0067763 | A1* | 3/2015 | Dalcher et al. | 726/1 |
| 2015/0089645 | A1* | 3/2015 | Vandergeest | 726/23 |

FOREIGN PATENT DOCUMENTS

| RU | 107619 | 8/2011 |
|---|---|---|
| RU | 107620 | 8/2011 |

OTHER PUBLICATIONS

International Search Report for PCT/RU2013/000249, mailed Aug. 29, 2013.
Klein, T., "Rootkit Profiler LX: Overview and Documentation—Version 0.12", available online at http://www.trapkit.de/research/rkprofiler/rkplx/rkprofilerlk_v0.12_20070422.pdf, Apr. 22, 2007.
Levine, John G., "A Methodology for Detecting and Classifying Rootkit Exploits", Gerogia Institute of Technology, Feb. 2004, available online at https://smartech.gatech.edu/bitstream/handle/I 853/5139/john_g_levine_200405_phd.pdf?sequence=I", c. 22-23, 53, 64-67, Feb. 2004.

* cited by examiner

*Primary Examiner* — Haresh N Patel
(74) *Attorney, Agent, or Firm* — Honigman Miller Schwartz and Cohn LLP

(57) ABSTRACT

The present invention relates to means for detecting malware. The method is realized on a computer with an operating system (OS) installed thereon, and comprises a step in which a point of interrupt is established when a system call is made by a user application requesting the transfer of control via an address in the kernel of the loaded OS. Next, the data structure of the loaded OS is checked. As this check is carried out, the address of the command in the random-access memory of the computer, by means of which command control will be transferred during the system call, is determined and the addresses of the commands to be executed during the system call are checked to see if they belong to the normal range of addresses of the OS kernel and OS kernel modules in the random-access memory. The presence of malware is then detected in the event that a command address does not belong to the normal range of addresses. The proposed method includes a dynamic check of the execution of the OS kernel code in order to detect the illegal interception and alteration of the code in the kernel and in the kernel modules (drivers) that are to be loaded. The proposed method enables the detection of both known and previously unregistered malware in an OS kernel and in OS kernel modules that are to be loaded.

1 Claim, 1 Drawing Sheet

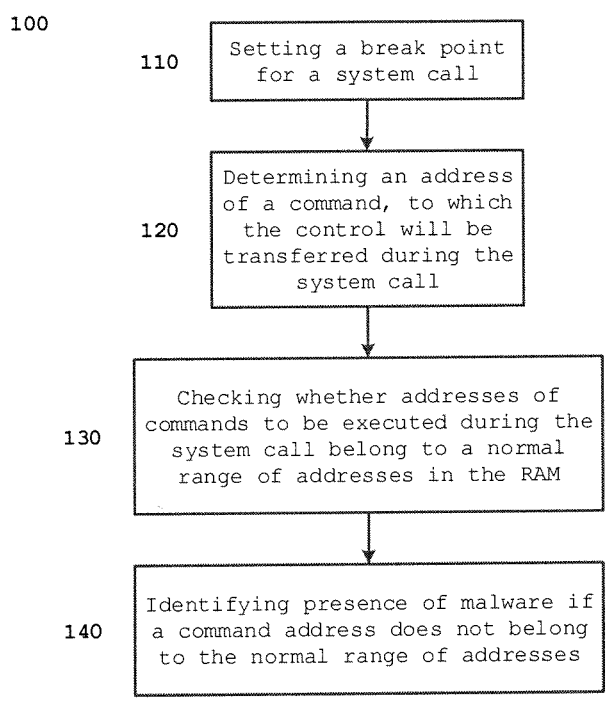

METHOD OF DETECTING MALWARE IN AN OPERATING SYSTEM KERNEL

REFERENCE TO RELATED APPLICATIONS

This application claims priority from both PCT Application PCT/RU2013/000249, filed Mar. 27, 2013, which claims the benefit of earlier filed Russian Application RU 2012113963, filed on Apr. 11, 2012, the entire contents of which are incorporated herein by reference.

FIELD OF THE INVENTION

The present invention relates to computer engineering and to providing information security of automated information systems, in particular, to means for detecting malware.

BACKGROUND ART

Basic methods of detecting malware in application software, which have been developed and are presently used, rely on:
1) detecting facts of hiding programs, files, processes, kernel modules by checking for such objects at various levels of an operating system (OS);
2) detecting features of earlier registered malware, in particular, sequences of executed code bytes, lines and constants typical to malware;
3) checking integrity of the executable kernel code in random-access memory.

Rootkit Profiler LX is a conventional application software package for detecting malware [1].

Rootkit Profiler LX checks:
1) addresses of the system call table, interrupt table, system call handler, interrupt handler;
2) the system call code, interrupt handler code;
3) pointers in structures of Virtual File System (VFS).

Therefore, said known tool has a deficiency in that it does not provide for the integrity check of the entire kernel code, or for the dynamic check of execution of the kernel code, so interceptions in OS data structures, as well as interceptions and code modifications in the kernel (except for virtual file system structures) cannot be detected.

Another conventional method for detecting malware [2] that is implemented in a computer with an operating system, according to one embodiment, comprises the steps of:
setting a break point when a user application makes a system call requesting to modify a data structure of the loaded operating system;
checking the data structure of the loaded operating system by performing the steps of:
  determining an address of a command, which has made modifications to the data structure, in the computer random-access memory;
  checking whether the command address belongs to a normal range of addresses of the operating system in the random-access memory;
  identifying presence of malware if the command address does not belong to the normal range of addresses.

In this context, the term "data structure" refers to tables of executed processes (including user applications) generated by the operating system, links to the system registry and files, etc.

Prior to implementing the method, read and write access is provided to random-access memory areas having the loaded OS kernel and kernel modules therein, and the operating system is downloaded into the computer. The method can be implemented in computers running a general-purpose operating system, such as Unix, Linux, Microsoft Windows, etc.

The method can be directly implemented using the following preliminarily created application software:
kernel debugger facilities operative to obtain data from data structures generated by the operating system by setting a break point;
an integrity checker operative to determine whether the data obtained by the kernel debugger facilities when the break point has been set contains inconsistencies typical to malware;
a detection module for coordinating the obtained data generated by the operating system, and for providing data to the integrity checker.

These software tools are not unique and can be created by a skilled person (programmer) familiar with the functions executed by the tools.

The latter known method is the most relevant prior art for the present invention.

However, said known method has a drawback of low probability of malware detection, since actions can be monitored only when an OS data structure is modified. Therefore, the known method is unable to detect malware directly in the OS kernel and kernel modules.

SUMMARY OF THE INVENTION

The present method involves the dynamic check of execution of the OS kernel code to detect illegal interceptions and code modifications in the kernel and loadable kernel modules (drivers).

The technical result relates to the increased probability of malware detection by enabling to detect illegal interceptions and code modifications in the OS kernel and loadable kernel modules.

Another technical result relates to enabling to check integrity of the executable kernel code.

To this end, a method is provided, the method comprising the steps of:
setting a break point when a user application makes a system call requesting to transfer control to an address in a kernel of a loaded operating system;
checking a data structure of the loaded operating system by performing the following steps:
  determining an address of a command, to which the control will be transferred during the system call, in a random-access memory of a computer;
  checking whether addresses of commands to be executed during the system call belong to a normal range of addresses of the operating system kernel and kernel modules in the random-access memory; and
  identifying presence of malware if a command address does not belong to the normal range of addresses.

Therefore, in contrast to the conventional method in which the check is performed only in the case of a modification in a data structure of the loaded operating system, the present method checks the entire plurality of addresses of commands executed during the system call.

This allows all the commands and address transitions to be controlled, including the ones generated by malware within the kernel and operating system modules, rather than only by malware in user applications.

Furthermore, integrity of the executable kernel code is verified as well.

BRIEF DESCRIPTION OF THE DRAWING

FIG. 1 - an illustrative flowchart of the method according to the present invention,

EMBODIMENTS OF THE INVENTION

The method (100) of detecting malware in a kernel of an operating system installed on a computer according to the present invention is generally described with reference to FIG. 1.

A break point is set (110) when a user application makes a system call requesting to transfer control to an address in the kernel of the loaded operating system. Then a data structure of the loaded operating system is checked by performing the following operations, An address of a command, to which the control will be transferred during the system call, in a random-access memory (RAM) of the computer is determined (120), and addresses of commands to be executed during the system call are checked (130) for belonging to a normal range of addresses of the operating system kernel and kernel modules in the RAM. Presence of malware is identified (140) if a command address does not belong to the normal range of addresses.

A prerequisite for implementing the present method (100) is to provide read and write access to random-access memory areas in which the kernel of the loaded operating system and kernel modules reside. This prerequisite can be most easily realized under Linux.

Implementation of the present method will now be described for a computer having:
1) Linux Ubuntu 9.10 operating system with kernel version 2.6.31.
2) Intel Pentium P6 or higher processor (USA).

Similarly to the prior art method, for automated execution of the method (100) a kernel debugger routine should to be preliminarily created for:
1) setting break points responsive to commands requesting to transfer control;
2) determining an address of a command, to which the control will be transferred, in a random-access memory.

The routine can be created by a person skilled in operating systems (programmer).

Before the actual implementation of the present method, it is advisable to build a trusted image of the operating system kernel for further comparison.

To do this, an image of the operating system kernel is built first, e.g. in the computer's hard disk, and then the kernel image is unpacked. Generally, the kernel code is packed using a conventional archiver program, and Gzip, Bzip algorithms and the like can be used for packing/unpacking.

The unpacked kernel code is in the 'elf.' file format. Code segments are determined in the resulting file.

Correction of modified addresses of the kernel code is performed in the code segments, as done by a kernel loader typical to this operating system:
  modification of alternative instructions—instructions listed in the '.altinstructions' section of the kernel;
  modification of instructions with the LOCK prefix;
  modification of instructions related to paravirtualization.

The result is the trusted (reference) image of the operating system kernel and the normal range of addresses of the kernel code residing in the random-access memory.

Thus, the normal range of kernel addresses is a set of random-access memory address ranges that hosts the trusted (reference) image of the kernel code and OS kernel modules upon booting the trusted (reference) operating system image in a regular operation mode in the absence of malware.

The trusted image of the OS kernel is built using standard means for handling OS files.

To obtain the normal range of addresses of the OS kernel and kernel modules, an auxiliary routine should be also created for:
1) building a trusted kernel image in the random-access memory;
2) determining an address of the beginning and end of each kernel segment in the random-access memory.

Advisability of creating the auxiliary routine is dictated by the fact that malware may modify standard OS tools to conceal its presence in the computer.

Creation of such an auxiliary routine is also within the skills of operating system programmers.

After the above preparatory steps, integrity of the kernel code of the operating system downloaded into the computer random-access memory is first checked by consecutive comparisons with the trusted kernel code.

Where a modification of an address is detected, the check is performed for whether or not the address belongs to a trusted module in the kernel. If not, a decision is taken that malware is detected.

If modified commands are detected, then a decision is also taken that malware is detected.

Upon detecting malware, any conventional method can be applied to neutralize it, for example, by sequentially completing a process associated with the malware; removing the malware and deleting a file containing the code of a program performing actions of the malware [2].

Upon successful verification of kernel code integrity, execution of the kernel code is dynamically checked.

To do this, a list of addresses is formed that correspond to code portions of the kernel and kernel modules.

Then, the kernel debugger locks switching of processes.

The processor is switched to the debug mode, and the trace flag TF=1 is set for all kernel threads.

Maskable interrupts are disabled by the CLI instruction.

Kernel entry point hookers are set (SYSENTER, int80h).

Maskable interrupts are enabled by the STI instruction.

The process switching is then unlocked.

When a debug interrupt is performed responsive to a transfer, the transfer address is checked.

If the address does not belong to the kernel code or kernel module code, the module that contains this address is identified as malicious.

Then the BTF=1 flag is set in the processor, and the debug interrupt handler is quitted.

Subsequently, the detected malicious kernel module can be neutralized using actions similar to those described above.

REFERENCES CITED

[1] Klein T. Rootkit Profiler LX. Overview and Documentation [electronic resource] (http://www.trapkit.de/research/rkprofiler/rkplx/RKProfilerLX_v0.12__20070422.pdf, Apr. 22, 2007)

[2] U.S. Pat. No. 7,571,482, Automated rootkit detector, Aug. 4, 2009.

The invention claimed is:
1. A method of detecting malware in a kernel of an operating system installed on a computer, the method comprising the steps of:
  setting a break point when a user application makes a system call requesting to transfer control to an address in the kernel of the loaded operating system;

checking a data structure of the loaded operating system by performing the following steps:
  determining an address of a command, to which the control will be transferred during the system call, in a random-access memory of the computer, and
  checking whether addresses of commands to be executed during the system call belong to a normal range of addresses of the operating system kernel and kernel modules in the random-access memory; and
identifying presence of malware if a command address does not belong to the normal range of addresses.

* * * * *